United States Patent
Tomida (10) Patent No.: US 8,468,468 B2
(45) Date of Patent: Jun. 18, 2013

(54) DATA TRANSMISSION SYSTEM, DEVICE, AND METHOD

(75) Inventor: Wataru Tomida, Aichi (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 187 days.

(21) Appl. No.: 11/526,055

(22) Filed: Sep. 25, 2006

(65) Prior Publication Data

US 2007/0073662 A1    Mar. 29, 2007

(30) Foreign Application Priority Data

Sep. 28, 2005   (JP) .................................. 2005-282837

(51) Int. Cl.
*G06F 3/048*    (2006.01)
(52) U.S. Cl.
USPC .......................................... 715/853; 715/854
(58) Field of Classification Search
USPC ................................................ 715/854, 853
See application file for complete search history.

(56) References Cited

U.S. PATENT DOCUMENTS

| 6,853,992 | B2* | 2/2005 | Igata ................................. 707/3 |
| 7,334,197 | B2* | 2/2008 | Robertson et al. ............ 715/853 |
| 2002/0078016 | A1 | 6/2002 | Lium et al. |
| 2004/0010513 | A1* | 1/2004 | Scherr et al. ............... 707/104.1 |
| 2004/0193609 | A1* | 9/2004 | Phan et al. ...................... 707/10 |
| 2005/0091272 | A1* | 4/2005 | Smith et al. ................ 707/104.1 |

FOREIGN PATENT DOCUMENTS

| GB | 2 378 348 | 2/2003 |
| JP | 2001-61036 | 3/2001 |
| JP | 2004-274486 A | 9/2004 |
| JP | 2005-260326 | 9/2005 |
| WO | WO 01/75728 A1 | 10/2001 |

OTHER PUBLICATIONS

Open Directory Project, URL: http://web.archive.org/web/20050920162348/http://dmoz.org/, 1998-2005, pp. 1-8, XP 002417565, Netscape.
European Search Report issued in European Patent Application No. EP 06 25 4954, dated Feb. 19, 2007.

(Continued)

*Primary Examiner* — Omar Abdul-Ali
(74) *Attorney, Agent, or Firm* — McDermott Will & Emery LLP (57) ABSTRACT

There is provided a data transmission device, which comprises a user input reception unit, a display unit, a directory selection unit configured to select a directory from among a plurality of directories in a hierarchical directory structure in accordance with an input for directory selection, a lower directory acquisition unit configured to acquire information on lower directories belonging to the selected directory, a lower directory display control unit configured to display the acquired information on lower directories, a search unit configured to search the selected directory for target destination information matching an input for searching inputted through the user input reception unit, and a data transmission unit configured to perform data transmission in accordance with the searched target destination information.

13 Claims, 8 Drawing Sheets

OTHER PUBLICATIONS

Japanese Office Action, with English translation, issued in Japanese Patent Application No. JP 2005-282837, mailed Apr. 9, 2008.

Summons to Attend Oral Proceedings issued in European Patent Application No. 06254954.8-1225, mailed Jul. 13, 2010.

Decision to Refuse a European Patent issued in European Patent Application No. EP 06 254 954.8 dated Dec. 28, 2010.

Yates et al., "Modern Information Retrieval," 1999, ACM Press, pp. 384-387.

Open Directory Search Guide, (Sep. 24, 2005), 4 pages.

Inside Active Directory Second Edition 29 pages and cover, accessed Jul. 12, 2010.

* cited by examiner

STATE WHERE SEARCH KEY IS PRESSED AND SELECTION MANNERS ARE DISPLAYED

```
Search:
  1: Alphabet Search
  2. Context Search
Select ▲▼ & OK
```

FIG.6A

↓ PRESS ▼ KEY

STATE WHERE CONTEXT SEARCH IS DESIGNATED

```
Search:
  1. Alphabet Search
  2: Context Search
Select ▲▼ & OK
```

FIG.6B

↓ PRESS OK KEY

STATE WHERE CONTEXT HAS BEEN SELECTED

```
Search:NIC
▲ Local
  Sales
▼ Development
Select ▲▼ & OK
```

FIG.6C

↓ PRESS ▼, OK KEY

STATE WHERE SALES HAS BEEN SELECTED

```
Search:Sales
▲ Group1
  Group2
▼ Group3
Select ▲▼ & OK
```

FIG.6D

↓ PRESS ▼ KEY

SELECT GROUP 1.
SINCE NO LOWER DIRECTORY EXISTS, MEMBERS ARE DISPLAYED, FIRST TEN ITEMS OF SALES-GROUP 1 ARE OBTAINED AND DISPLAY.

```
Search
▲ Adam
  Alfred
▼ Andy
Select ▲▼ & OK
```

USER IS ABLE TO START SEARCHING BY INPUTTING SEARCH STRING DURING CONTEXT REPRESENTATION

DATA TRANSMISSION SYSTEM, DEVICE, AND METHOD

CROSS-REFERENCE TO RELATED APPLICATION

This application claims priority under 35 U.S.C. §119 from Japanese Patent Application No. 2005-282837, filed on Sep. 28, 2005. The entire subject matters of the application are incorporated herein by reference.

BACKGROUND

1. Technical Field

Aspects of the present invention relate to a data transmission device configured to search for user information and to execute data transmission based on the searched user information.

2. Related Art

Data transmission devices capable of executing data transmission by obtaining user information concerning destination addresses of users from a directory server (e.g., an LDAP (Lightweight Directory Access Protocol) server) and using the user information as a destination address (e.g., a FAX number, or an e-mail address) for the data transmission are widely used. In Japanese Patent Provisional Publication No. 2004-274486A (hereafter, referred to as JP 2004-274486A), an example of such a data transmission device is disclosed.

As described in the JP 2004-274486A, in order to retrieve target user information from the directory server, the user needs to check a directory structure formed in the directory server and to input a search criteria (e.g., a keyword) which the user extracts from the directory structure and judges to be suitable for searching the directory structure for the target user information.

However, such a user operation for extracting a suitable search criteria from the directory structure of the directory server is troublesome for the user particularly in the case where the user is not familiar with the directory structure of the directory server. The user not familiar with the directory structure of the directory server may fail to obtain a desirable search result, for example, by inputting an inappropriate keyword. Even if the user has successfully inputted an appropriate keyword, the user may be confused about whether an obtained search result is an intended result.

SUMMARY

Aspects of the present invention are advantageous in that a data transmission device enabling a user to efficiently acquire target user information from a directory structure of a directory server.

DETAILED DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided a data transmission device, which comprises a user input reception unit configured to receive a user input, a display unit, a directory selection unit configured to select a directory from among a plurality of directories in a hierarchical directory structure in accordance with an input for directory selection inputted through the user input reception unit, the hierarchical directory structure containing destination information, a lower directory acquisition unit configured to acquire information on lower directories belonging to the selected directory from the hierarchical directory structure, a lower directory display control unit configured to display the acquired information on lower directories on the display unit so that one of the lower directories can be selected using the directory selection unit, a search unit configured to search the selected directory for target destination information matching an input for searching inputted through the user input reception unit, and a data transmission unit configured to perform data transmission in accordance with the searched target destination information.

Such a configuration enables a user to check whether displayed information is within a desired search range. It is possible to search only a desired directory (selected by the user) for target destination information. Consequently, the efficiency of searching for desired destination information can be enhanced.

In at least one aspect, the user input reception unit accepts the input for searching in a state where onscreen representation on the display unit has changed from representation concerning one layer of the hierarchical directory structure to representation concerning another layer of the hierarchical directory structure.

In at least one aspect, the user input reception unit accepts the input for searching during a context search mode where a user is allowed to select a desired directory from among displayed directories, while moving a cursor between an upper directory and a lower directory through the user input reception unit.

In at least one aspect, the input for searching remains on the display unit after the searching by the search unit is finished.

In at least one aspect, the data transmission device further comprises a selected directory display control unit configured to display the selected directory on the display. In this case, the input for searching comprises a search criterion, and the search unit searches a lower directory selected through the directory selection unit for the target destination information matching the search criterion inputted through the user input reception unit in a state where the selected directory is displayed.

With this configuration, it is possible to find out target destination information from a desired lower directory selected by the user. Such a configuration enables the user to easily find target destination information.

In at least one aspect, if the selected directory contains the lower directories belonging to the selected directory, the search unit searches entire information contained in the selected directory for the target destination information Such a configuration enables the user to execute the searching after narrowing directories even if the user does not exactly know the hierarchical directory structure.

In at least one aspect, the data transmission device further comprises a data holding unit configured to hold the search criterion inputted through the user input reception unit, a search criterion display unit configured to display the search criterion, and a search criterion modification unit configured to modify the search criterion held by the data holding unit in accordance with an input inputted through the user input reception unit. In this case, the search unit searches again the selected directory for the target destination information matching the search criterion modified through the search criterion modification unit.

With this configuration, the user is able to modify the search criterion and to execute again the searching under the modified search criterion.

In at least one aspect, the search unit starts to search for the target destination information in response to a start command for searching inputted through the input unit.

In at least one aspect, the hierarchical directory structure is formed in an external server to which the data transmission device is connected through a network. In this case, the data transmission device comprises a communication interface which interfaces the data transmission device with the external server through the network.

According to another aspect of the invention, there is provided a data transmission system, which comprises a directory server storing a plurality of directories in a hierarchical directory structure containing destination information, and a data transmission device communicatably connected to the directory server. The data transmission device comprises a user input reception unit configured to receive a user input, a display unit, a directory selection unit configured to select a directory from among a plurality of directories contained in the hierarchical directory structure in the directory server in accordance with an input for directory selection inputted through the user input reception unit, a lower directory acquisition unit configured to acquire information on lower directories belonging to the selected directory from the hierarchical directory structure, a lower directory display control unit configured to display the acquired information on lower directories on the display unit so that one of the lower directories can be selected using the directory selection unit, a search unit configured to search the selected directory for target destination information matching an input for searching inputted through the user input reception unit, and a data transmission unit configured to perform data transmission in accordance with the searched target destination information.

Such a configuration enables the user to check whether displayed information is within a desired search range. It is possible to search only a desired directory (selected by the user) for target destination information and to execute the searching while checking whether a desirable search result is obtained. Consequently, the efficiency of searching for desired destination information can be enhanced.

According to another aspect of the invention, there is provided a computer usable medium having computer readable instructions stored thereon, which, when executed by a computer, are configured to select a directory from among a plurality of directories in a hierarchical directory structure in accordance with an input for directory selection inputted through an input unit, the hierarchical directory structure containing destination information, to acquire information on lower directories belonging to the selected directory from the hierarchical directory structure, to display the acquired information on lower directories on a display unit so that one of the lower directories can be selected, to accepting an input for searching through the input unit, to search the selected directory for target destination information matching the input for searching inputted through the input unit, and to perform data transmission in accordance with the searched target destination information.

Such a configuration enables the user to check whether displayed information is within a desired search range. It is possible to search only a desired directory (selected by the user) for target destination information and to execute the searching while checking whether a desirable search result is obtained. Consequently, the efficiency of searching for desired destination information can be enhanced.

According to another aspect of the invention, there is provided a method for data transmission. The method comprises selecting a directory from among a plurality of directories in a hierarchical directory structure in accordance with an input for directory selection inputted through an input unit, the hierarchical directory structure containing destination information, acquiring information on lower directories belonging to the selected directory from the hierarchical directory structure, displaying the acquired information on lower directories on a display unit so that one of the lower directories can be selected, accepting an input for searching through the input unit, searching the selected directory for target destination information matching the input for searching inputted through the input unit, and performing data transmission in accordance with the searched target destination information.

Such a configuration enables the user to check whether displayed information is within a desired search range. It is possible to search only a desired directory (selected by the user) for target destination information and to execute the searching while checking whether a desirable search result is obtained. Consequently, the efficiency of searching for desired destination information can be enhanced.

In the above mentioned computer usable medium or the method, the hierarchical directory structure may be formed in an external server to which the data transmission device is connected through a network.

Embodiment

Hereafter, an embodiment according to the invention will be described with reference to the accompanying drawings.

Figure 1:
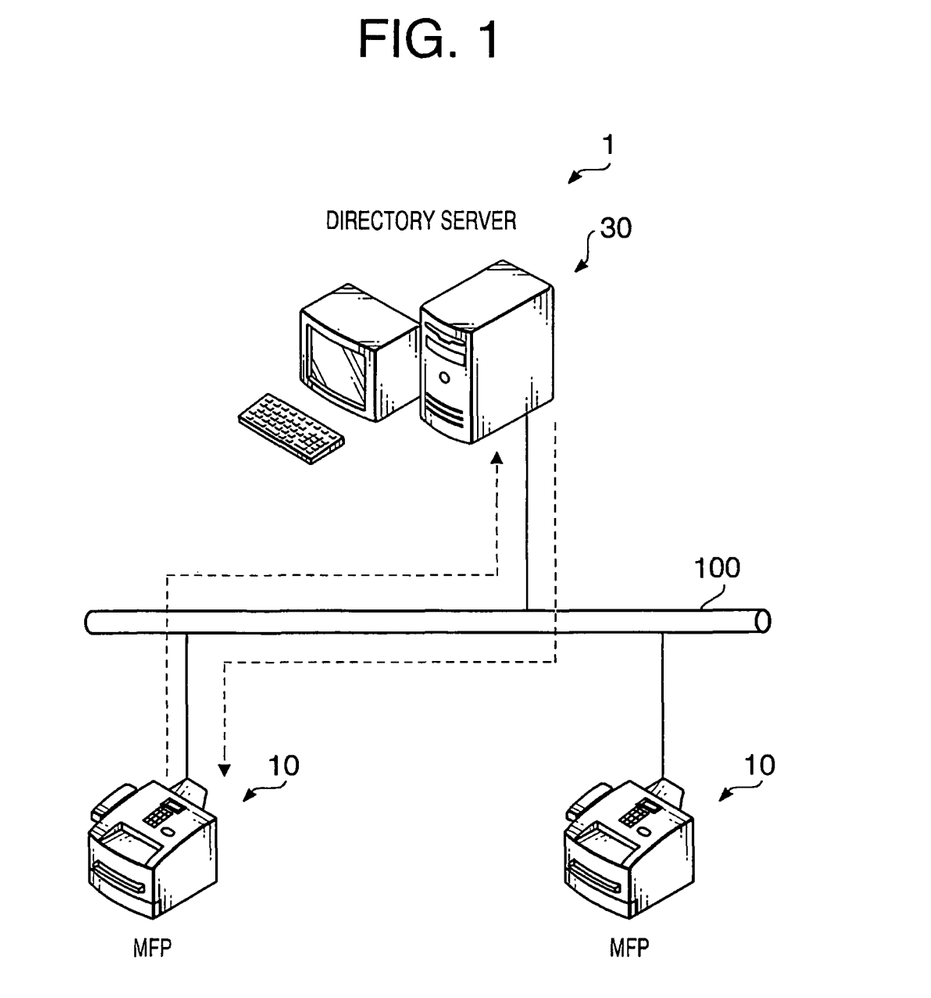
FIG. 1 shows a system configuration of a data transmission system according to an embodiment.

FIG. 1 shows a system configuration of a data transmission system 1 according to an embodiment. In the data transmission system 1, MFPs (multifunction peripherals) 10 are connected to a directory server 30 via a network 100. The directory server 30 stores entry information including information on destinations (hereafter, referred to as destination information). Since the MFPs 10 have the same configuration, a detailed configuration of one of them is explained below. The MFP 10 has multiple functions such as a facsimile function, a mailing function, a printing function, a scanner function, and a copying function. The directory server 30 is, for example, a LDAP server. Various types of networks, such as serial communication, parallel communication, a local area network or a wireless network, may be used as the network 100.

Figure 2:
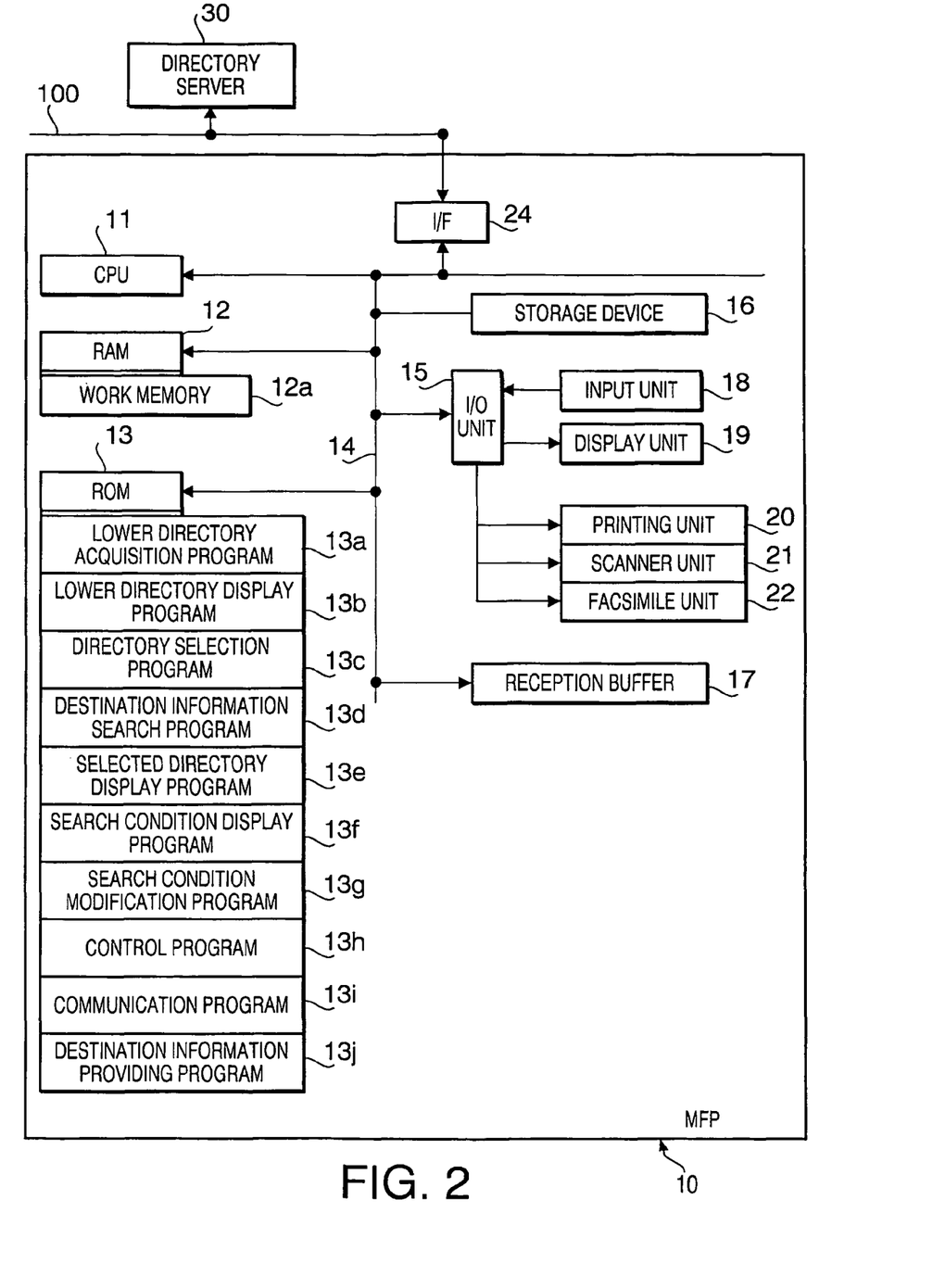
FIG. 2 is a block diagram of a multifunction peripheral provided in the data transmission system.

FIG. 2 is a block diagram of the MFP 10. As shown in FIG. 2, the MFP 10 includes a CPU 11, a RAM 12 having a work memory 12a, a ROM 13 storing various programs, an I/O (input/output) unit 15, a storage device 16, a communication interface 24, and a data reception buffer 17, which are connected to each other via a bus 14. The storage device 16 is, for example, a non-volatile memory (e.g., EEPROM) or a hard disk drive. The communication interface 24 interfaces the MFP 10 with the directory server 30 through the network 100. In the data reception buffer 17, data transmitted from the network 100 is temporarily stored.

To the input/output unit 15, an input unit 18, a display unit 19, a printing unit 20, a scanner unit 21, and a facsimile unit 22 are connected. The input unit 18 is, for example, a touch panel, buttons, or ten keys. The display unit 19 is, for example, an LCD. The printing unit 20 is implemented, for example, by an inkjet printing mechanism, laser printing mechanism, thermal transfer printing mechanism or dot impact printing mechanism. In the ROM 13, a lower directory acquisition program 13a, a lower directory display program 13b, a directory selection program 13c, a destination information search program 13d, a selected directory display program 13e, a search criterion display program 13f, a search criterion modification program 13g, a control program 13h, a communication program 13i, and a destination information providing program 13j are stored.

Figure 4A:
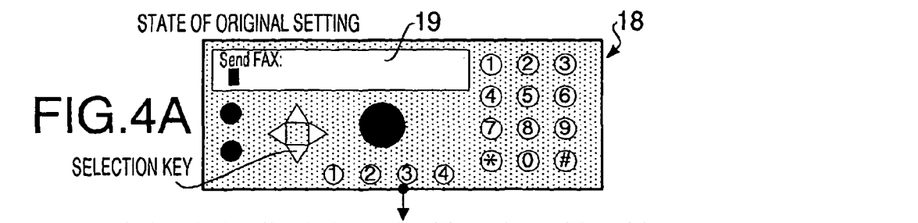
FIGS. 4A to 4F show examples of operation statuses of an input unit and a display unit of the multifunction peripheral.
Figure 4B:
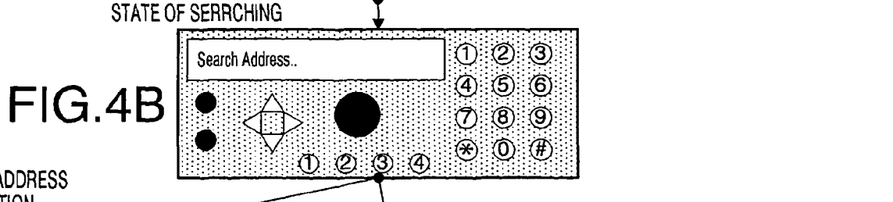
Figure 4C:
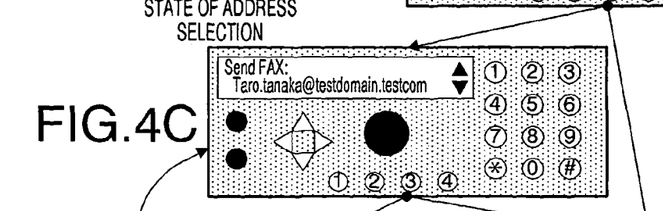
Figure 4D:
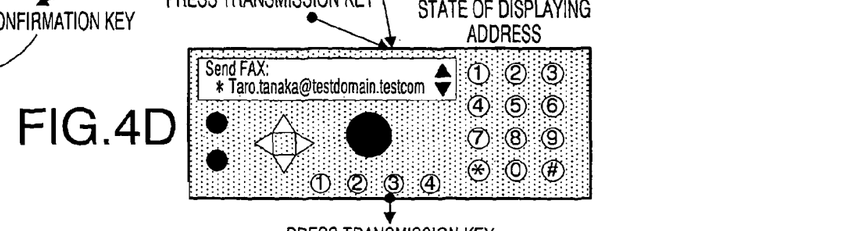
Figure 4E:
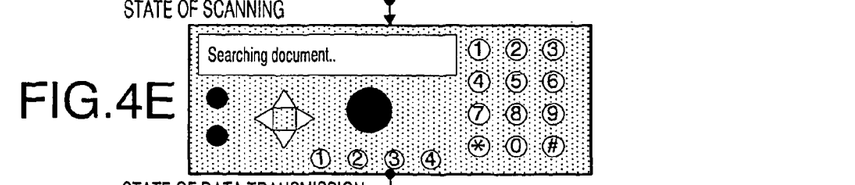
Figure 4F:
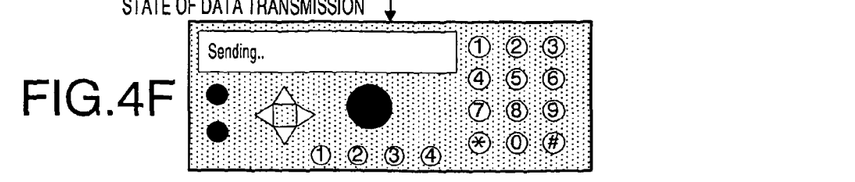

Here, examples of operation statuses of the input unit 18 and the display unit 19 of the MFP 10 are explained briefly referring to FIGS. 4A-4F. The input unit 18 and the display unit 19 are formed integrally with the MFP 10. The input unit 18 has numeric keys, alphabet keys (not shown), selection keys (rightward triangle key, leftward triangle key, upward triangle key and downward triangle key), a confirmation key (OK key), a transmission key, etc. The keys of the input unit 18 are pressed by the user of the MFP 10 for starting the operations shown in FIGS. 4A-4F. FIG. 4A shows a state where an original is set. FIG. 4B shows a state where the searching is executed. FIG. 4C shows a state where the user is selecting an address. FIG. 4D shows a state where the selected address is displayed. FIG. 4E shows a state where the scanning is executed after the transmission key is pressed. FIG. 4F shows a state of executing data transmission.

Referring again to FIG. 2, in the MFP 10 as a data transmission device, the printing unit 20, the scanner unit 21 (used for copying and image reading) and the facsimile unit 22 are connected to the input/output unit 15 to be controlled by the CPU 11. The operations of the printing unit 20, the scanner unit 21 and the facsimile unit 22 are controlled by the CPU 11 executing the control program 13h loaded from the ROM 13 into the work memory 12a of the RAM 12.

The MFP 10 has an e-mail transmission/reception function for transmitting and receiving e-mails (including print image data) to/from other devices via the network 100 and external communication networks connected to the network 100. The e-mail transmission/reception function is controlled by the CPU 11 executing the communication program 13i for e-mail transmission/reception stored in the ROM 13.

Figure 3:
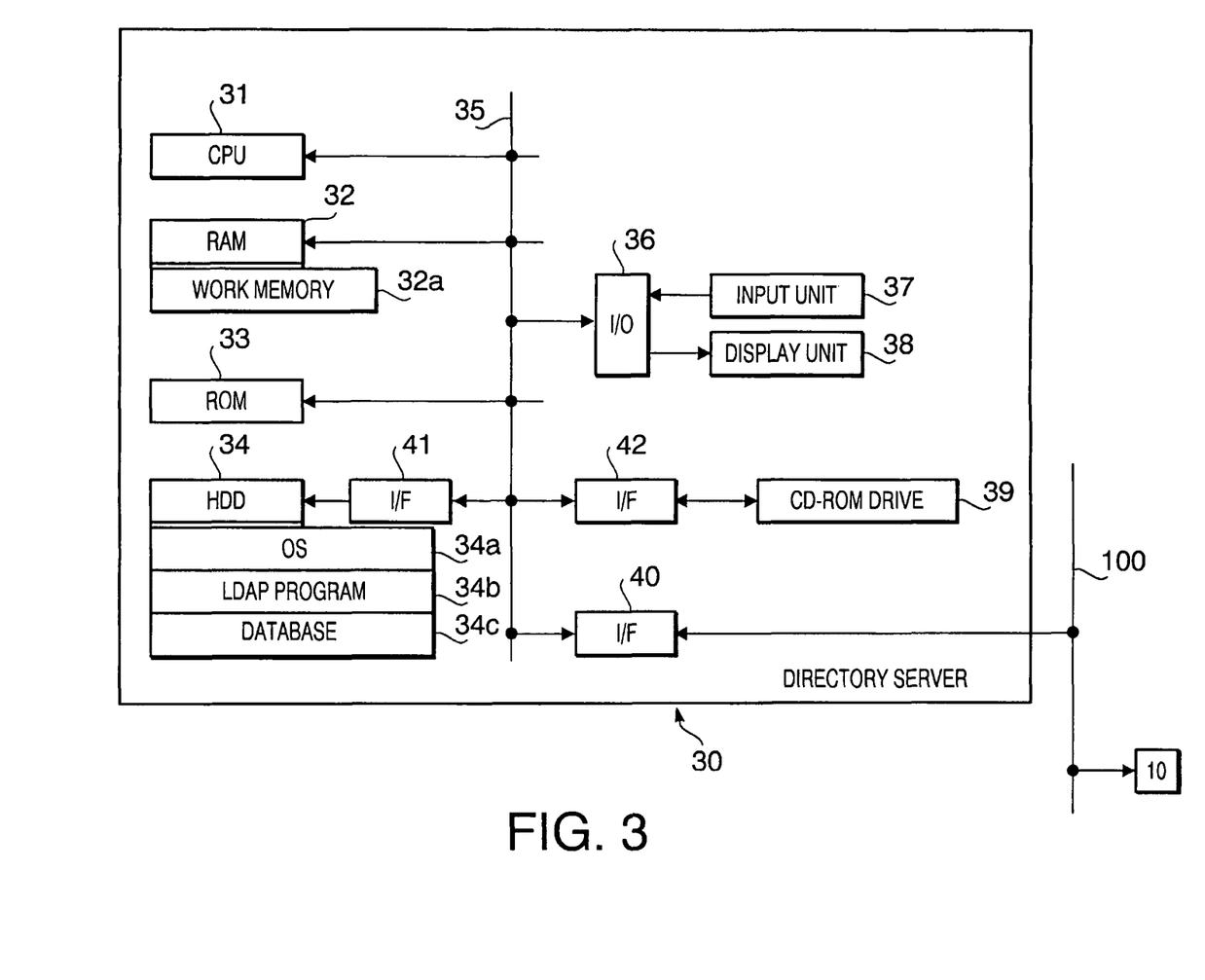
FIG. 3 is a block diagram showing a control system of a directory server provided in the data transmission system.

FIG. 3 is a block diagram showing a control system of the directory server 30. The directory server 30 is implemented by a personal computer (or a workstation) including a CPU 31, a RAM 32 including a work memory 32a, a ROM 33 storing various programs, an HDD (Hard Disk Drive) 34 as a storage unit, a bus line 35, an I/O unit 36, a CD-ROM drive 39 and a communication I/F 40. The communication I/F 40, as an interface for wired communication, is connected to the network 100 to communicate data (print control data, etc.) with the MFPs 10, etc. The HDD 34 and the CD-ROM drive 39 are connected to the bus line 35 via an I/F 41 and an I/F 42, respectively. The HDD 34 stores an OS (Operating System) 34a as basic software of the directory server 30, an LDAP program 34b for implementing a function as an LDAP server, a database 34c of the entry information, etc. To the I/O unit 36, an input/operation device 37 (keyboard, mouse, etc.) and a display device 38 (LCD, CRT, etc.) are connected.

In this embodiment, the directory server 30 serves as an LDAP server having a function of performing data communications in accordance with an LDAP (Lightweight Directory Access Protocol). In the HDD 34, a hierarchical directory structure is formed, and a plurality of pieces of destination information are classified into groups respectively corresponding to the directories. More specifically, in each directory, the entry information containing destination information (e.g., a fax number or an e-mail address) and name information associated with each other is stored.

Figure 5:
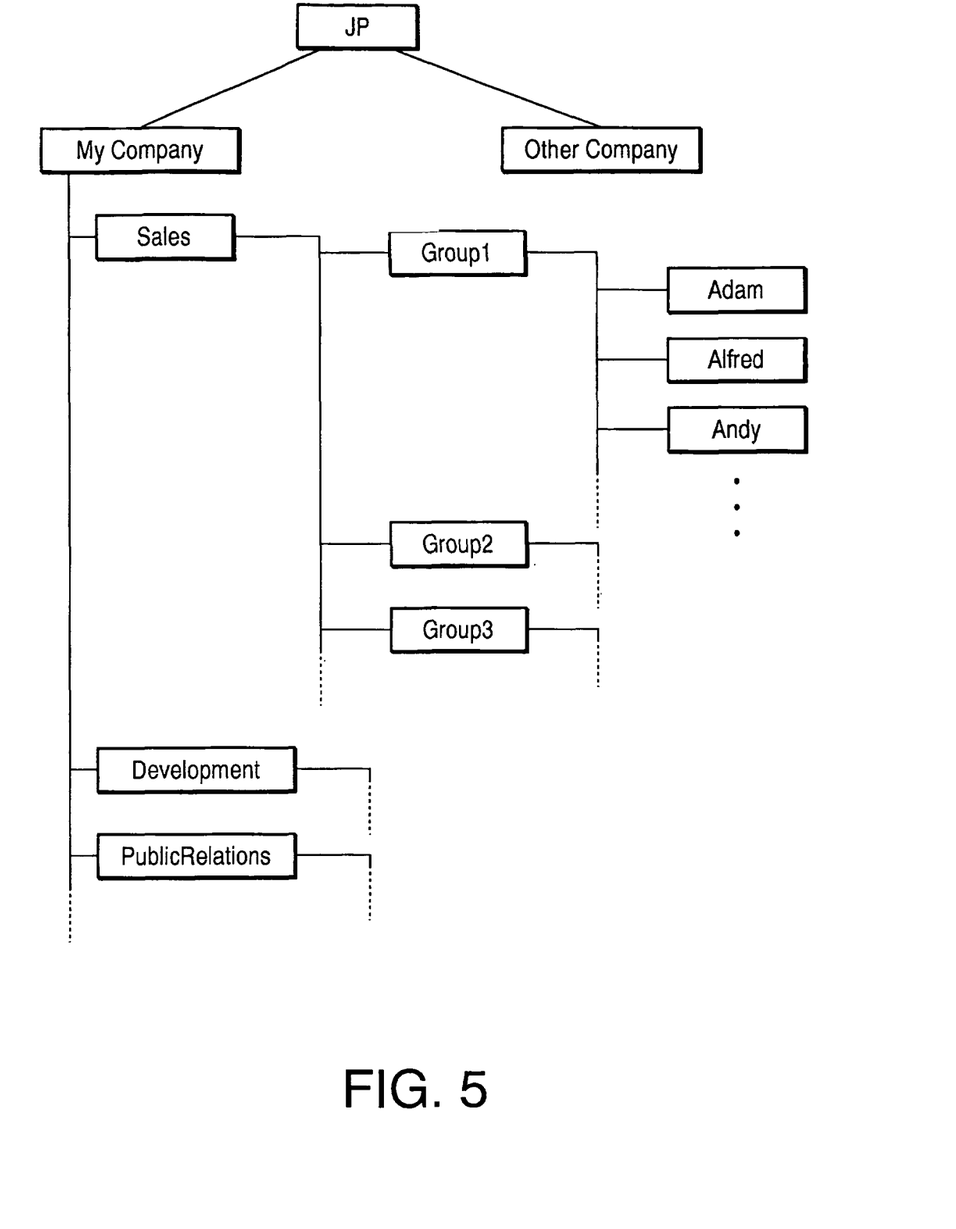
FIG. 5 shows an example of a hierarchical directory structure stored in the directory server.

FIG. 5 shows an example of a hierarchical directory structure formed in the HDD 34 of the directory server. In the example shown in FIG. 5, two directories "My Company" and "Other Company" are formed under a root directory "JP", and lower directories including "Sales", "Development" and "PublicRelations" are formed under the directory "My Company". Under the directory "Sales", lower directories including "Group1", "Group2" and "Group3" are formed. Under the Group 1, user names and associated destination information are stored.

Referring back to FIG. 2, the lower directory acquisition program 13a functions, when executed by the CPU 11 on the work memory 12a, to select a directory from the hierarchical directory structure in the HDD 34 and to obtain lower directories (e.g., directory names) belonging to the selected directory. When executed by the CPU 11 on the work memory 12a, the lower directory display program 13b functions to display lower directories on the display unit 19. When executed by the CPU 11 on the work memory 12a, the directory selection program 13c functions to select a directory from among the lower directories in accordance with a user input through the input unit 18. When executed by the CPU 11 on the work memory 12a, the destination information search program 13d functions to search a plurality of pieces of destination information in the selected directory for target destination information from, for example, in accordance with name information in the entry information. When executed by the CPU 11 on the work memory 12a, the selected directory display program 13e functions to display the selected directory on the display unit 19.

A search criterion inputted by a user is stored in the RAM 12. When executed by the CPU 11 on the work memory 12a, the search criterion display program 13f functions to display the search criterion stored in the RAM 12 on the display unit 19. When executed by the CPU 11 on the work memory 12a, the search criterion modification program 13g functions to modify the search criterion stored in the RAM 12 in accordance with a user operation through the input unit 18. When executed by the CPU 11 on the work memory 12a, the destination information providing program 13j functions to provide destination information to be used for facsimile or mail data transmission.

Hereafter, operations of the MFP 10 are explained with reference to FIGS. 6A to 6E, 7F to 7J and 8. FIG. 8 is a flowchart illustrating a search and data transmission process executed under control of the CPU 11 of the MFP 10. FIGS.

6A to 6E and 7F to 7J show examples onscreen representations made on the display unit 19 by executing the process shown in FIG. 8. If a search key (which is one of the keys of the input unit 18) is pressed by a user in a standby state (step S1), control proceeds to step S2 where the CPU 11 displays a search manner selection screen on the display unit 19 (see FIG. 6A).

Figure 6A:
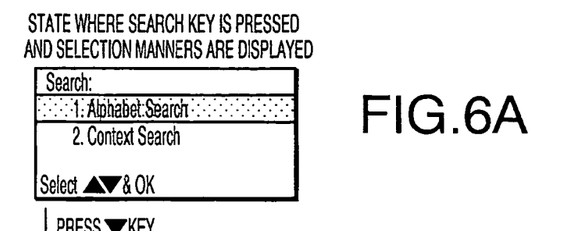
FIGS. 6A to 6E are explanatory illustrations of operations of the multifunction peripheral in a search and data transmission process.
Figure 6B:
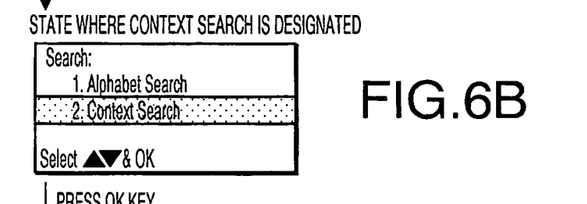

In the screen shown in FIG. 6A, two search manners "1. Alphabet Search" and "2. Context Search" are display such that the user is able to select one of the search manners. In the search manner "Alphabet Search", the user inputs a search criterion and the search criterion input by the user is used for the searching. In the search manner "Context Search", the user selects a desirable directory from among displayed directories, while moving a cursor between an upper directory and a lower directory, so as to find desired destination information. The selection of search manners is conducted by the user using the selection key (an upward triangle key or a downward triangle key) and the confirmation key. By pressing once the downward triangle key on the screen shown in FIG. 6A, onscreen representation moves to a state shown in FIG. 6B. In the screen shown in FIG. 6B, an inverse representation part has moved downward by one line. If the confirmation key is pressed once on the screen shown in FIG. 6B, the selection of the search manner "2. Context Search" is confirmed (see step S2: "Context Search"). If the "Alphabet Search" is selected in step S2, control proceeds to step S12.

Figure 6C:
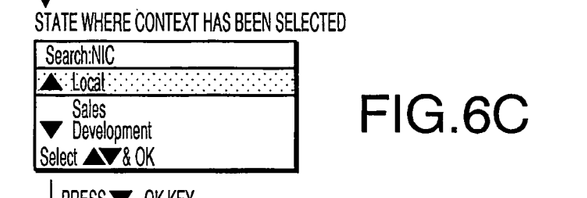

Next, in step S3, the CPU 11 reads the hierarchical directory structure from the HDD 34 of the directory server 30 to obtain lower directories belonging to the root directory. The obtained lower directories are then displayed on the display unit 19 of the MFP 10 as shown in FIG. 6C (step S4). The operations of the steps S3 and S4 are attained by executing the lower directory acquisition program 13a and the lower directory display program 13b. On the screen shown in FIG. 6C, "Local", "Sales", and "Development" are displayed. If the "Local" is selected, information stored in the storage device 16 of the MFP 10 is displayed. "Sales" and "Developments" are directory names in the HDD 34 of the directory server 30, and the user is able to select one of these directory names by pressing the upward triangle key or the downward triangle key.

As shown in FIG. 8, the user is able to cause the process to directly proceed from step S4 to step S12 for execution of the alphabetical search, and is further able to cause the process to proceed from step S4 to step S5 by selecting the OK key. That is, if the user decides to continue the "2. Context Search" by pressing the OK key, the process proceeds from step S4 to step S5. On the other hand, the process proceeds from step S4 to step S12 if the user inputs a search criterion. In other words, the user is able to cause the process to move to the alphabetical search by inputting a search criterion (i.e., a character string) to the displayed screen regardless of a status of the currently displayed screen. Such a configuration enables the user to cause the process to move to the alphabetical search after the user narrows directories to some extent.

For example, the user is able to input a string "NIC" to an upside field on the screen shown in FIG. 6C so as to start the alphabetical search under the search criterion "NIC" by further pressing the search key. That is, by inputting the string "NIC" and then pressing the search key, the MFP 10 searches for destination information including the string "NIC".

Figure 6D:
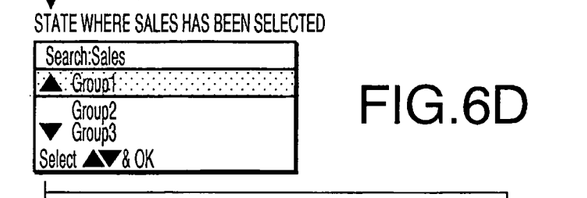

After one of the displayed directories is selected in step S5, the CPU 11 judges whether lower directories belonging to the current directory exist (step S6). If the lower directories exist (S6: "TREE IS FOUND"), control proceeds to step S11 where a next leaf is obtained and then control returns to step S4 where the lower directories are displayed and the CPU waits for a next user input. If the lower directories do not exist (S6: "NO TREE"), control proceeds to step S7 where destination names are obtained. Then, the destination names are displayed on the display unit 19 (step S8). Operations of steps S5, S6 and S7 are illustrated in FIGS. 6D and 6D. That is, if a directory "Group I" is selected on the screen (FIG. 6D) in which the lower directories are displayed, the onscreen representation moves to a state shown in FIG. 6E.

Figure 6E:
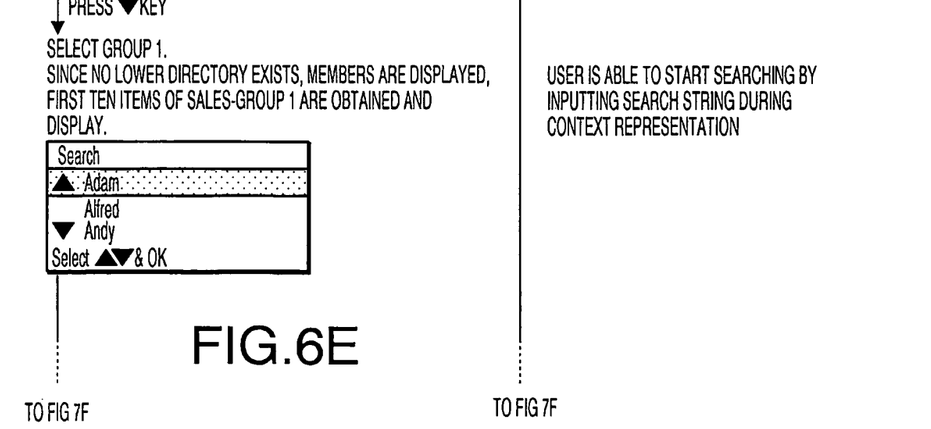

On the screen shown in FIG. 6E, destination names (e.g., first ten user names) contained in the directory "Group 1" are displayed because in this case no lower directory is found under the current directory. The operation for selecting one of the lower directories is attained by executing the directory selection program 13c.

Figure 7F:
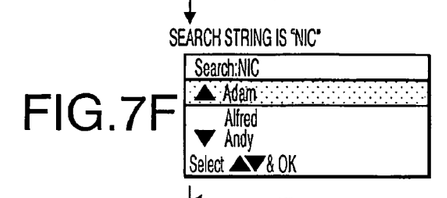
FIGS. 7F to 7J are explanatory illustrations of operations of the multifunction peripheral in the search and data transmission process.
Figure 7G:
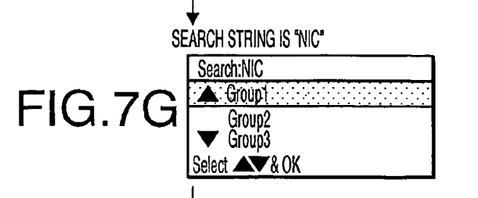
Figure 7H:
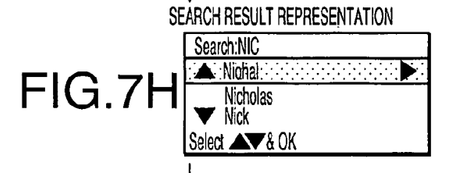
Figure 7I:
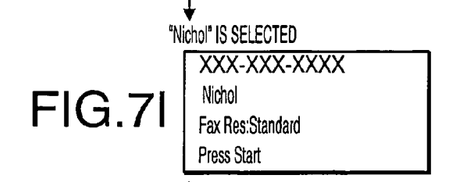
Figure 7J:
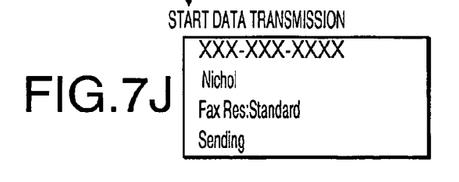
Figure 8:
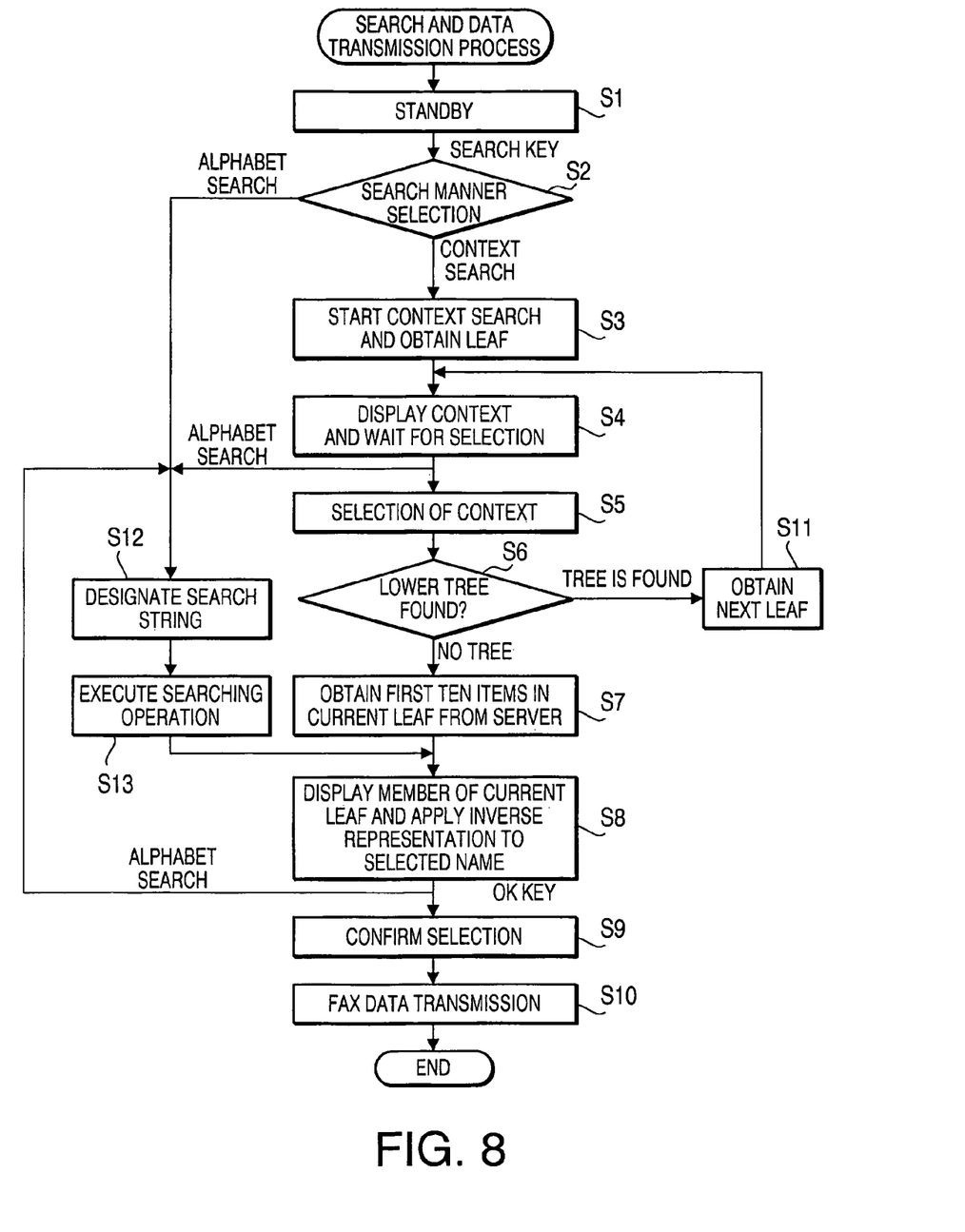
FIG. 8 is a flowchart of the search and data transmission process.

In the state of step S8 where the destination names are displayed, the user is able to cause the process to move to the alphabetical search (step S12) by inputting a search criterion (see FIG. 7F). If the user presses the search key in step S12, the MFP 10 searches for the destination information matching the inputted search criterion (step S13). The search operation is attained by executing the destination information search program 13d. If the user presses the confirmation key on the screen on which the search result is displayed (see FIG. 7H), facsimile data transmission for the selected destination name is executed (steps S9 and S10, and screens shown in FIGS. 7I and 7J). Such a configuration enables the user to display only destination names matching the search criterion and to quickly select a desired destination names from the displayed destination names. There is no need for the user to select a desired destination name from among a number of lower directories while conducting a troublesome selection operation (i.e., scrolling the directories using the upward and downward triangle keys).

As described above, the user is able to cause the process to directly move from step S4 to step S12. For example, if the user inputs a search criterion to the screen (FIG. 6D) where the directory "Group 1" is selected (i.e., "Group 1" is in a state of inverse representation), the onscreen representation moves to the screen shown in FIG. 7G. If the user presses the search key on the screen shown in FIG. 7G, control proceeds from step S12 to step S13 where the searching is conducted in a range of the displayed lower directories. That is, if the searching is executed in a state of the screen shown in FIG. 7F, all the items belonging to the "Group 1" are targeted for the searching. On the other hand, if the searching is executed in a state of the screen show in FIG. 7G, all the directories belonging to the "Sales" are targeted for the searching. Such a configuration enables the user to execute the searching in regard to a relatively large range of destination information as in the case of FIG. 7G. The onscreen representation for the selected directory is attained by executing the selected directory display program 13e.

In the above mentioned search and data transmission process, the search criterion used for the searching remains on the screen after the searching is finished. For example, if the searching is executed using the search criterion "NIC" on the screen shown in FIG. 7F, the search result is displayed on the screen shown in FIG. 7H and the search criterion "NIC" remains on the screen shown in FIG. 7H. That is, the CPU 11 saves the search criterion "NIC" without deleting the search criterion after the searching is finished so as to keep the search criterion displayed on the display unit 19. Therefore, the user is able to modify the previously used search criterion to obtain a better search result.

Such a configuration enables the user to avoid re-inputting the search criterion from the start. Even if the user inputs an inappropriate search criterion, the user is able to quickly correct the inappropriate search criterion and to start the searching under the corrected search criterion. Such a configuration enables a user not familiar with a search operation to easily execute the searching. The search result remains on the screen even if the user re-select a directory so that the searching can be executed under the same search criterion for the re-selected directory. The above mentioned save of the search criterion and the modification of the search criterion are attained by executing the search criterion display program 13*f* and the search criterion modification program 13*g*.

As described according to the embodiment, the MFP 10 operates to obtain directory names from the hierarchical directory structure formed in the HDD 34 of the directory server, to display the directory names on the display unit 19, and to enable the user to search for desired destination information. The user is able to execute the searching in regard to a desirable limited range of destination information. Consequently, a searching operation becomes easier for the user.

In general, a storage amount of a directory server (e.g., the directory server 30) is larger than that of a multifunction peripheral (e.g., the MFP 10). That is, the directory server 30 is able to store a large amount of destination information. Therefore, a user needs to search for desired destination information from among a large amount of information stored in the directory server 30. In this regard, according to the embodiment, the user is able to narrow the directories to be subjected to the searching, and to execute the searching only for the narrowed directories. Such a configuration enhances the efficiency of searching.

Further, according to the embodiment, the search criterion is not deleted after the searching is finished. Therefore, the user does not need to re-input the previously used search criterion. Such a configuration enables the user to quickly modify the previously used search criterion and to re-start the searching under the modified search criterion.

Only the preferred embodiment of the present invention and but a few examples of its versatility are shown and described on the present disclosure. It is to be understood that the present invention is capable of use in various other combinations and environments and is capable of changes or modifications within the scope of the inventive concepts as expressed herein.

What is claimed is:

1. A data transmission device, comprising:
   a user input reception unit configured to receive a user input;
   a display unit;
   a directory selection unit configured to select a directory from among a plurality of directories in a hierarchical directory structure in accordance with an input for directory selection inputted through the user input reception unit, the hierarchical directory structure containing destination names;
   a selected directory display control unit configured to display a selected directory selected by a first selection input through the user input reception unit on the display unit;
   a lower directory acquisition unit configured to, after the selected directory has been selected, acquire information on lower directories belonging to the selected directory from the hierarchical directory structure;
   a lower directory display control unit configured to display the acquired information on lower directories on the display unit so that one of the lower directories can be selected using the directory selection unit;
   a search unit configured to, after one of the lower directories has been selected by a second selection input through the user input reception unit, and without searching directories not belonging to the selected one of the lower directories, execute an alphabetical search of the selected one of the lower directories for a target destination name matching a character string inputted through the user input reception unit and configured to display names matching the character string on the display unit as a result of the alphabetical search;
   a destination name selection unit configured to select a target destination name from the searched names displayed on the display unit; and
   a data transmission unit configured to execute facsimile or e-mail transmission to transmit data to a facsimile number or an e-mail address corresponding to the target destination name selected by the destination name selection unit.

2. The data transmission device according to claim 1, wherein the user input reception unit accepts the input for the alphabetical search in a state where onscreen representation on the display unit has changed from representation concerning one layer of the hierarchical directory structure to representation concerning another layer of the hierarchical directory structure.

3. The data transmission device according to claim 1, wherein the user input reception unit accepts the input for the alphabetical search during a context search mode where a user is allowed to select a desired directory from among displayed directories, while moving a cursor between an upper directory and a lower directory through the user input reception unit.

4. The data transmission device according to claim 1, wherein the input for searching remains on the display unit after the searching by the search unit is finished.

5. The data transmission device according to claim 1, wherein if the selected one of the lower directories contains one or more further lower directories belonging to the selected one of the lower directories, the search unit searches entire information contained in the selected one of the lower directories for the target destination name.

6. The data transmission device according to claim 1, further comprising:
   a data holding unit configured to hold the character string inputted through the user input reception unit;
   a character string display unit configured to display the character string; and
   a character string modification unit configured to modify the character string held by the data holding unit in accordance with an input inputted through the user input reception unit,
   wherein the search unit searches again the selected one of the lower directories for the target destination name matching the character string modified through the character string modification unit.

7. The data transmission device according to claim 1, wherein the search unit starts to search for the target destination name in response to a start command for searching inputted through the user input reception unit.

8. The data transmission device according to claim 1, wherein:
   the hierarchical directory structure is formed in an external server to which the data transmission device is connected through a network, and
   the data transmission device comprises a communication interface which interfaces the data transmission device with the external server through the network.

9. A data transmission system, comprising:
a directory server storing a plurality of directories in a hierarchical directory structure containing destination names; and
a data transmission device communicatably connected to the directory server,
wherein the data transmission device comprises:
a user input reception unit configured to receive a user input;
a display unit;
a directory selection unit configured to select a directory from among a plurality of directories contained in the hierarchical directory structure in the directory server in accordance with an input for directory selection inputted through the user input reception unit;
a selected directory display control unit configured to display a selected directory selected by a first selection input through the user input reception unit on the display unit;
a lower directory acquisition unit configured to, after the selected directory has been selected, acquire information on lower directories belonging to the selected directory from the hierarchical directory structure;
a lower directory display control unit configured to display the acquired information on lower directories on the display unit so that one of the lower directories can be selected using the directory selection unit;
a search unit configured to, after one of the lower directories has been selected by a second selection input through the user input reception unit, and without searching directories not belonging to the selected one of the lower directories, execute an alphabetical search of the selected one of the lower directories for a target destination name matching a character string inputted through the user input reception unit and configured to display names matching the character string on the display unit as a result of the alphabetical search;
a destination name selection unit configured to select a target destination name from the searched names displayed on the display unit; and
a data transmission unit configured to execute facsimile or e-mail transmission to transmit data to a facsimile number or an e-mail address corresponding to the target destination name selected by the destination name selection unit.

10. A computer readable storage medium having instructions stored thereon, which, when executed by a computer, cause the computer to:
select a directory from among a plurality of directories in a hierarchical directory structure in accordance with an input for directory selection inputted through an input unit, the hierarchical directory structure containing destination names;
display a selected directory selected by a first selection input through the user input reception unit on a display unit;
after the selected directory has been selected, acquire information on lower directories belonging to the selected directory from the hierarchical directory structure;
display the acquired information on lower directories on the display unit so that one of the lower directories can be selected;
accept a character string through the input unit;
after one of the lower directories has been selected by a second selection input through the user input reception unit, execute an alphabetical search of the selected one of the lower directories, without searching directories not belonging to the selected one of the lower directories, for a target destination name matching the character string inputted through the input unit;
display names matching the character string on the display unit as a result of the alphabetical search;
receive a target destination name selected from the searched names displayed on the display unit; and
execute facsimile or e-mail transmission to transmit data to a facsimile number or an e-mail address corresponding to the received selected target destination name.

11. The computer readable storage medium according to claim 10, wherein the hierarchical directory structure is formed in an external server to which the data transmission device is connected through a network.

12. A method for data transmission, comprising:
selecting a directory from among a plurality of directories in a hierarchical directory structure in accordance with a first selection input for directory selection inputted through an input unit, the hierarchical directory structure containing destination names;
displaying the selected directory on a display unit;
acquiring information on lower directories belonging to the selected directory from the hierarchical directory structure;
displaying the acquired information on lower directories on the display unit so that one of the lower directories can be selected;
selecting one of the lower directories by a second selection input through the input unit;
accepting a character string through the input unit;
after one of the lower directories has been selected by the second selection input, executing an alphabetical search of the selected one of the lower directories, without searching directories not belonging to the selected one of the lower directories, for a target destination name matching the character string inputted through the input unit;
displaying names matching the character string on the display unit as a result of the alphabetical search;
receiving a target destination name selected from the searched names displayed on the display unit; and
executing facsimile or e-mail transmission to transmit data to a facsimile number or an e-mail address corresponding to the received selected target destination name.

13. The method according to claim 12, wherein the hierarchical directory structure is formed in an external server to which the data transmission device is connected through a network.

* * * * *